(12) United States Patent
Choi et al.

(10) Patent No.: US 6,537,349 B2
(45) Date of Patent: Mar. 25, 2003

(54) PASSIVE LOW PRESSURE FLASH GAS COMPRESSION SYSTEM

(75) Inventors: Michael S. Choi, Houston, TX (US); James N. Collins, Katy, TX (US)

(73) Assignee: Conoco, Inc., Houston, TX (US)

( * ) Notice: Subject to any disclaimer, the term of this patent is extended or adjusted under 35 U.S.C. 154(b) by 77 days.

(21) Appl. No.: 09/818,110

(22) Filed: Mar. 27, 2001

(65) Prior Publication Data

US 2002/0139248 A1 Oct. 3, 2002

(51) Int. Cl.[7] ................................................ B01D 19/00
(52) U.S. Cl. ............................. 95/247; 95/258; 95/266; 96/193
(58) Field of Search ............................. 96/193; 95/247, 95/258, 266

(56) References Cited

U.S. PATENT DOCUMENTS

| | | | | |
|---|---|---|---|---|
| 2,765,045 A | * | 10/1956 | Meyers | |
| 2,937,140 A | * | 5/1960 | Stinson | |
| 2,970,107 A | * | 1/1961 | Gilmore | |
| 3,038,285 A | * | 6/1962 | Mavrovic | |
| 3,159,473 A | | 12/1964 | Meyers et al. | |
| 3,578,077 A | * | 5/1971 | Glenn, Jr. et al. | |
| 3,926,664 A | * | 12/1975 | Verreydt | |
| 5,009,680 A | * | 4/1991 | Brekke | |
| 5,314,613 A | * | 5/1994 | Russo | |
| 5,582,252 A | | 12/1996 | Richmond et al. | |
| 6,120,254 A | * | 9/2000 | Popov | |
| 6,132,494 A | * | 10/2000 | Kjos et al. | |
| 6,218,174 B1 | * | 4/2001 | Keyser | |

FOREIGN PATENT DOCUMENTS

| GB | 2242373 A | 10/1991 |
|---|---|---|
| WO | WO 95/07414 | 3/1995 |

OTHER PUBLICATIONS

International Search Report, dated Jul. 22, 2002, 8 pages.

* cited by examiner

*Primary Examiner*—Duane S. Smith
(74) *Attorney, Agent, or Firm*—Rosenthal & Osha L.L.P.

(57) ABSTRACT

A subsea passive flash gas compression system that includes a first separator that removes high pressure flash gas from a hydrocarbon product, a second separator that removes low pressure flash gas from the hydrocarbon product after the high pressure flash gas has been removed, and an ejector. The ejector includes a high pressure input that is coupled to a high pressure flash gas output of the first separator. The ejector also includes a low pressure input that is coupled to a low pressure flash gas output of the second separator. An output of the ejector is coupled to an outlet pipeline that extends from proximate the sea bottom to the sea surface.

15 Claims, 3 Drawing Sheets

PASSIVE LOW PRESSURE FLASH GAS COMPRESSION SYSTEM

BACKGROUND OF THE INVENTION

The transportation of hydrocarbons produced from subsea wells is an integral part of offshore hydrocarbon production operations. In a typical offshore production arrangement, as shown in FIG. 1, a plurality of subsea wells (not shown) are drilled from an offshore drilling and production platform 1. Once the targeted formations (not shown) have been reached through drilling operations, production tubing (not shown) is typically set in place and further procedures including, for example, the perforation of the production tubing in selected target zones, are performed to produce hydrocarbons from the well. The offshore drilling and production platform 1 may include storage facilities 2 for the temporary storage of hydrocarbons produced from wells (not shown).

Delivery of hydrocarbons produced from subsea wells may be performed with any of several techniques known in the art. For example, hydrocarbons may be produced from a remote subsea wellhead (e.g., the subsea wellhead may be positioned at a subsea location that is some distance away from the location of the offshore drilling and production platform 1) and then piped to the offshore drilling and production platform 1. Alternatively, the hydrocarbons produced from subsea wells may be routed from a subsea wellhead directly to land locations through a pipeline, as long as the wellhead is located sufficiently close to the shore. Hydrocarbons may also be produced from a subsea well and then transferred through a pipeline 3 to a moored floating production, storage, and offloading tanker (FPSO tanker) 4.

Regardless of the technique used to deliver hydrocarbons from the well to transportation facilities, the hydrocarbons must be processed before being transported to other facilities for further refining or delivery. An important requirement for the transportation of liquid hydrocarbons is that low pressure flash gas must be removed from the liquid hydrocarbons so that the vapor pressure of the liquid hydrocarbons is reduced. Reduced vapor pressure ensures that low pressure flash gas will not "evolve," or come out of solution, while the hydrocarbons are being transported. For standard tanker transport, the vapor pressure of the transported hydrocarbons must be near or below atmospheric pressure (14.7 psia) in order to minimize gas evolution during loading of the tanker. Evolving flash gas can pose a safety hazard for transporters and for the environment.

Hydrocarbon processing to remove low pressure flash gas may be performed at land based facilities for producing wells that are located close to the shore. Deepwater wells that are located significant distances offshore provide a more complicated processing issue. For example, processing of hydrocarbons to remove low pressure flash gas may be performed at production platforms or at FPSOs. Processing at either of these locations, however, requires the presence of shuttle tankers to transport the processed hydrocarbon (e.g., the hydrocarbon with a reduced vapor pressure) to other facilities. For example, production platforms and FPSOs have a limited storage capacity for holding processed hydrocarbons. The problem is particularly relevant for FPSOs because the storage capacity of an FPSO is limited by the volume of the hold of the ship (which is further limited because of the space required to house the processing equipment). Thus, if shuttle tankers are unavailable due to, for example, poor weather conditions, processing must be interrupted when all storage facilities are full. Processing interruptions or slowdowns may have adverse economic consequences because of the high cost of operating and maintaining offshore facilities.

An alternative method includes processing hydrocarbons with a subsea separation system. Subsea separation systems are known in the art, and staged separation is the most common technique used in the industry for hydrocarbon stabilization. Preferably, pressure at the last stage of a staged separation system is at or near atmospheric pressure so that a desired level of hydrocarbon stabilization may be achieved without excessive heating (e.g., because heating liquid hydrocarbons increases the vapor pressure and facilitates removal of flash gas). Therefore, flash gas extracted from the hydrocarbons in the last stage of the staged separation system is typically also at or near atmospheric pressure. Generation of the low pressure at the last stage of separation typically requires the use of a mechanical compressor installed near the separation equipment on the seafloor because the separation system is located at great depth. The mechanical compressor typically requires an independent power source, and the mechanical compressor must be regularly maintained. Further, the low pressure flash gas may require a pressure boost to provide a pressure differential so that the flash gas can overcome pipe friction and the static pressure in a pipeline and flow to the surface (e.g., the ocean surface). As a result, prior art systems typically include boosting the pressure of the extracted low pressure flash gas with a mechanical compressor. Once the low pressure flash gas reaches the surface, the flash gas may be disposed of via a flare or may be separately transported.

An alternative to boosting the flash gas pressure with a compressor is to forego subsea processing and transport the hydrocarbon with an elevated vapor pressure directly to the surface. Transport to the surface is facilitated by operating the last stage of the subsea separation process at a sufficiently high pressure to provide the necessary pressure differential required to boost the hydrocarbon to the surface. However, this "live" hydrocarbon still contains flash gas at a higher than atmospheric pressure and the "live" hydrocarbon must be processed, as previously mentioned, before being loaded onto shuttle tankers.

SUMMARY OF THE INVENTION

One aspect of the invention is a system for subsea flash gas compression comprising a first separator adapted to remove high pressure flash gas from a hydrocarbon product and a second separator is adapted to remove low pressure flash gas from the hydrocarbon product after removal of the high pressure flash gas therefrom. An ejector is coupled at a high pressure input thereof to a high pressure flash gas output of the first separator and at a low pressure input thereof to a low pressure flash gas output of the second separator. An output of the ejector is coupled to an outlet pipeline extending from proximate the sea bottom to the sea surface.

In another aspect, the invention comprises a method of separating flash gas from a hydrocarbon product. The method comprises separating high pressure flash gas from the hydrocarbon product in a first separator, and a flash gas output of the first separator is coupled to a high pressure input of an ejector. Low pressure flash gas is separated from the hydrocarbon product after removal of the high pressure flash gas therefrom in a second separator, and a flash gas output of the second separator is coupled to a low pressure input of the ejector. An output of the ejector is conducted from proximate the second separator on the sea bottom to the sea surface.

Other aspects and advantages of the invention will be apparent from the following description and the appended claims.

DETAILED DESCRIPTION

An embodiment of the invention comprises a system for removing low pressure flash gas from hydrocarbons produced from subsea wells. The invention comprises a low maintenance solution by passively removing low pressure flash gas using the motive force extractable from pressurized gas evolved from crude hydrocarbons to boost the low pressure flash gas to the surface without the use of, for example, a mechanical compressor.

Figure 2:
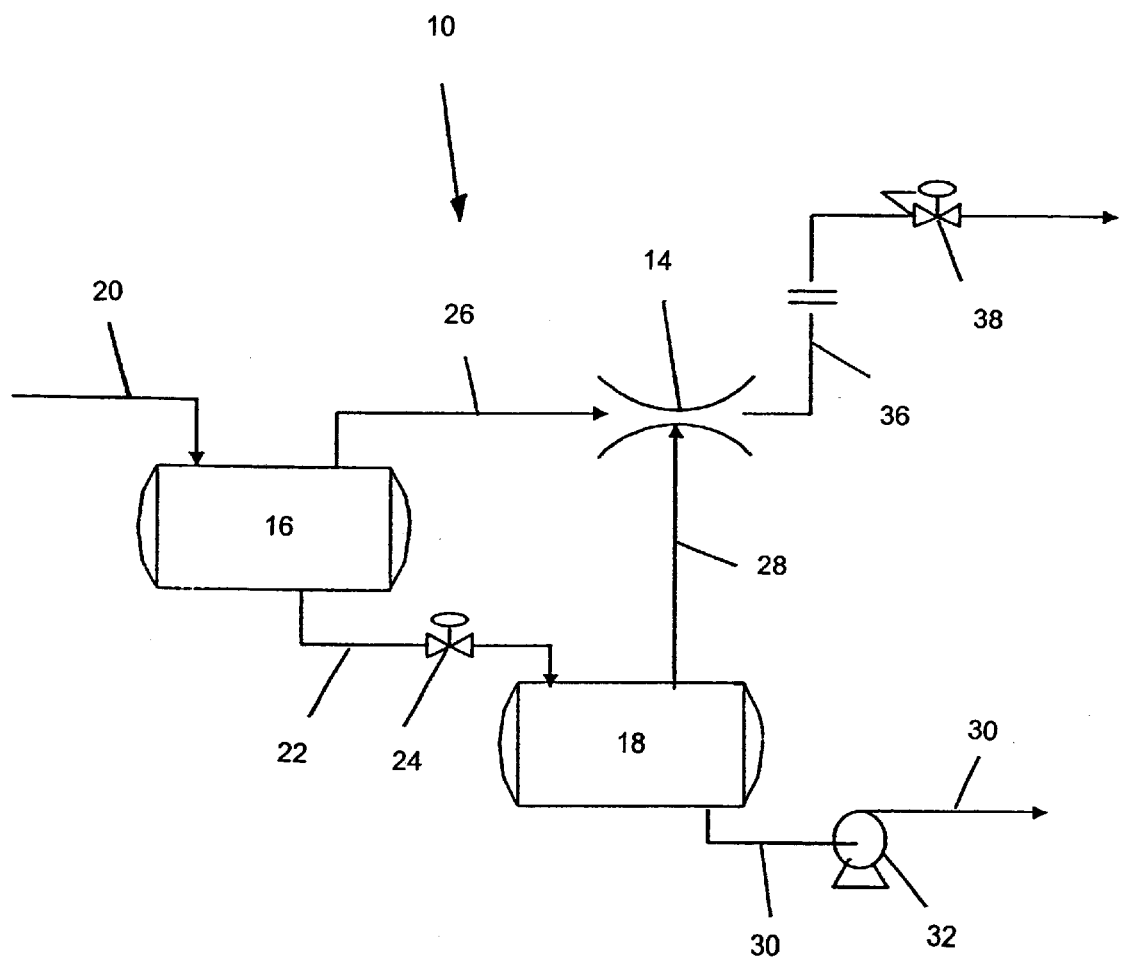
FIG. 2 shows an embodiment of a passive low pressure flash gas compression system.

An embodiment of the invention, as shown generally at 10 in FIG. 2, comprises a subsea, two stage oil and gas separation system. The embodiment shown in FIG. 2 comprises a high pressure separator 16, a low pressure separator 18, and an ejector 14 coupled to both the high pressure separator 16 and the low pressure separator 18. Hydrocarbons produced from a well (not shown) flow into an input of the high pressure separator 16 through a pipeline 20 that may be regulated by a valve (not shown). The high pressure separator 16 (e.g., a first stage of the separation) operates at a pressure of, for example, 500 psi. However, 500 psi is only a typical operating pressure and is not intended to limit the invention.

When the hydrocarbon flow is passed though the high pressure separator 16, high pressure flash gas evolves from the flow and is transported out of the high pressure separator 16 through a high pressure output 26. The high pressure flash gas flows through the high pressure output 26 to the ejector 14, as will be described in detail below. The processed liquid hydrocarbon flow is transmitted from a liquid hydrocarbon outlet of the high pressure separator 16 to an inlet of the low pressure separator 18 through a piping system 22. A flow control device, such as a valve 24, may be positioned between the high pressure separator 16 and the low pressure separator 18 to regulate the processed hydrocarbon flow.

In the second stage of the separation, low pressure flash gas is extracted from the processed hydrocarbon flow in the low pressure separator 18. The low pressure separator 18 operates at a pressure of at most atmospheric pressure (14.7 psia), but typically operates below atmospheric pressure, as will be further explained. As a result, the low pressure flash gas extracted in the low pressure separator 18 is typically at or below atmospheric pressure. The low pressure flash gas moves to a low pressure input of the ejector 14 through a low pressure gas output 28. The processed liquid hydrocarbon flows out of the low pressure separator 18 through, for example, a boosting pump 32 and a hydrocarbon outlet pipeline 30.

Figure 3:
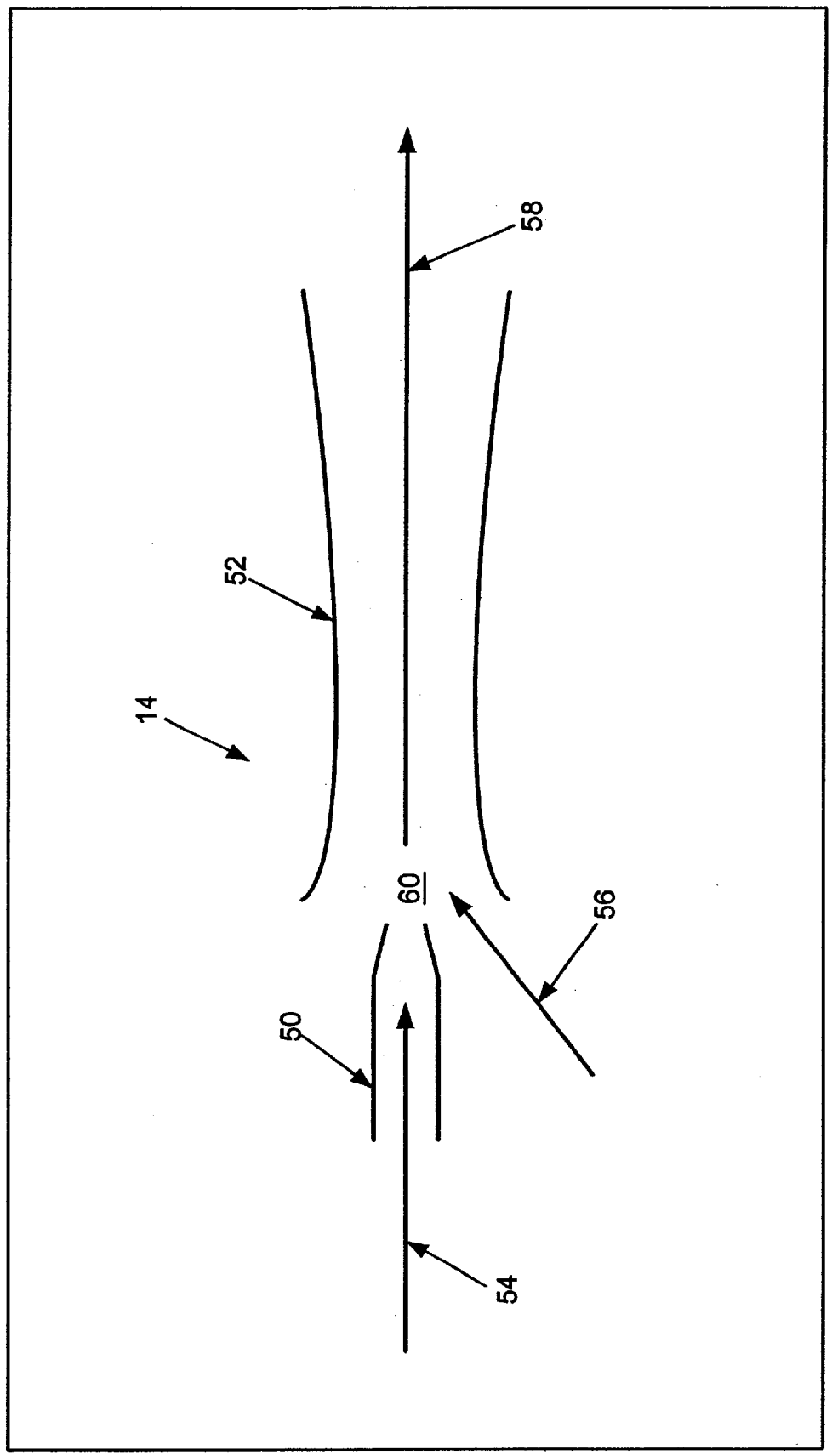
FIG. 3 shows a simplified view of a subsea ejector of an embodiment of the invention

The ejector 14, which may also be referred to as an "eductor" or a "jet pump," comprises structure that is known in the art. The ejector 14, as shown in FIG. 3, comprises a nozzle 50, a diffuser 52, a high pressure input 54, and a low pressure input 56. In an embodiment of the invention, high pressure flash gas from the first separator is conducted to the high pressure input 54. The high pressure flash gas comprises a "motive gas" for operating the ejector (14 in FIG. 3), and the high gas pressure is converted into kinetic energy (velocity) as it flows through the nozzle (50 in FIG. 3).

In an embodiment of the invention, low pressure flash gas from the second separator is conducted to the low pressure input (56 in FIG. 3). The relatively high pressure, high velocity flow of the high pressure input (54 in FIG. 3) (e.g., the flow is of a relatively high pressure and velocity when compared to the pressure and velocity of the flow of the low pressure input (56 in FIG. 3)) through the nozzle (50 in FIG. 3) creates a low pressure region (60 in FIG. 3) that induces flow from the low pressure output (28 in FIG. 2) into the low pressure region (60 in FIG. 3).

Flow induction into the low pressure region (60 in FIG. 3) is caused by the Venturi effect, where the flow from the low pressure input (56 in FIG. 3) is drawn to the low pressure region (60 in FIG. 3) proximate the nozzle (50 in FIG. 3) exit. The low pressure flash gas from the low pressure input (56 in FIG. 3) mixes with the high pressure flash gas from the high pressure input (54 in FIG. 3) in the low pressure region (60 in FIG. 3). The two flows combine to produce an ejector outlet flow (58 in FIG. 3) through the diffuser (52 in FIG. 3) with a pressure below that of the high pressure input (54 in FIG. 3) flow but above that of the low pressure input (56 in FIG. 3) flow.

The combination of the relative mass flow rates of the flash gas in the high pressure input (54 in FIG. 3) and the low pressure input (56 in FIG. 3) determine the mass flow rate of the ejector outlet flow (58 in FIG. 3). The pressure of the ejector outlet flow (58 in FIG. 3) and the geometry of the ejector (14 in FIG. 3) determine the level of compression of the ejector outlet flow (58 in FIG. 3) as it passes through the diffuser (52 in FIG. 3). By properly selecting geometric parameters of the ejector (14 in FIG. 3) components and by controlling the pressure in an outlet pipeline, such as a surface pipeline (36 in FIG. 2), the operating pressures of the high pressure separator (16 in FIG. 2) and the low pressure separator (18 in FIG. 2) may "self-adjust" and seek equilibrium operating levels. In this manner, using a surface control valve (38 in FIG. 2) to change the pressure in the surface pipeline (36 in FIG. 2) can maintain a selected pressure at the low pressure input to the ejector (14 in FIG. 2). Further, geometric parameters of the ejector (14 in FIG. 3) such as the cross-sectional areas of the nozzle (50 in FIG. 3), the diffuser (52 in FIG. 3), the high pressure input (54 in FIG. 3), and the low pressure input (56 in FIG. 3) may be adjusted to achieve optimum operating pressures.

Regulation of the pressure in the surface pipeline (36 in FIG. 2) with the surface pressure control valve (38 in FIG. 2), in combination with the self-adjusting nature of the passive low pressure flash gas compression system (10 in FIG. 2), means that active subsea control is not generally required. Therefore, the low pressure flash gas compression system (10 in FIG. 2) comprises a passive flash gas separation system that transports extracted flash gas to the surface while not requiring the same level of regular maintenance as a subsea compressor. Specifically, the pressure in the surface pipeline (36 in FIG. 2) is boosted by the ejector outlet flow (58 in FIG. 3), and a mechanical compressor is not required.

After the flash gas has been transported through the outlet pipeline, such as the surface pipeline (36 in FIG. 2) of an embodiment of the invention, the flash gas may be disposed of by any method known in the art. For example, the gas may be burned off in a flare at the ocean surface or may be collected and transported to an alternate location.

Alternatively, the flash gas may be transported to a storage facility and held for later disposal. The passive low pressure flash gas compression system (10 in FIG. 2) is cooled by ambient seawater cooling.

Figure 1:
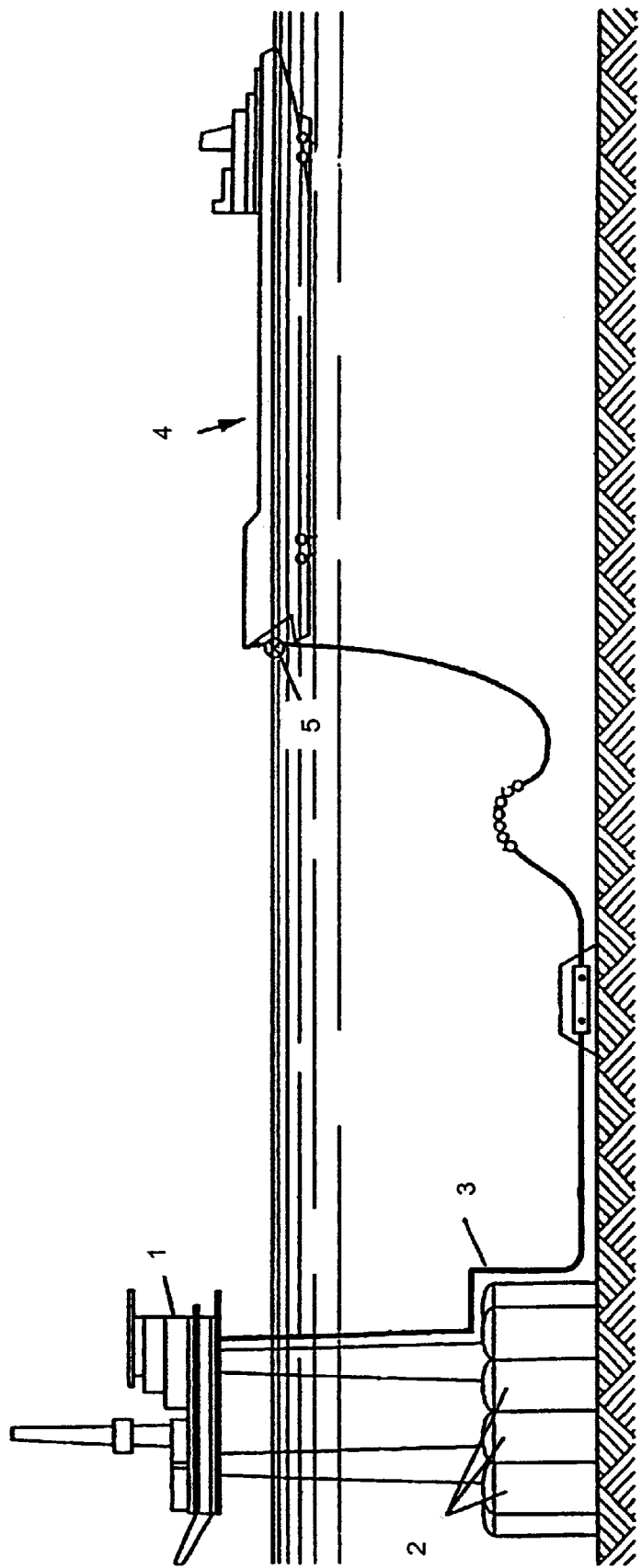
FIG. 1 shows a prior art drilling and production system.

The processed hydrocarbon in the hydrocarbon outlet pipeline (30 in FIG. 2) may be distributed in several ways. For example, the processed hydrocarbons may be loaded directly onto shuttle tankers if the hydrocarbon outlet pipeline (30 in FIG. 2) is attached to a buoyant docking station (5 in FIG. 1) that may be accessed from the ocean surface. The processed hydrocarbons may also be routed to a drilling and production platform (1 in FIG. 1) for offloading onto shuttle tankers. If required, a boosting pump (32 in FIG. 2) may be located proximate the hydrocarbon outlet pipeline (30 in FIG. 2) to increase the pressure of the processed hydrocarbon flow.

Alternatively, the processed hydrocarbons may be stored in a facility such as a submerged storage tank as described in U.S. patent application Ser. No. 09/818,117 entitled "Seabed Storage and Tanker Offtake System," assigned to the assignee of the present invention, filed herewith, and incorporated by reference in its entirety. The storage tank described in the aforementioned application can be used to store the processed hydrocarbons for later offloading onto, for example, shuttle tankers. The storage tank, in combination with the passive low pressure flash gas compression system, provides a system by which hydrocarbons (with a substantially atmospheric vapor pressure) may be produced substantially continuously and then stored until shuttle tankers are available for transport. As a result, there is no need to halt production during adverse weather conditions or other times when shuttle tankers are unavailable. Less downtime may increase the rate at which hydrocarbons may be produced from wells and, as a result, may increase the profitability of offshore production operations.

Moreover, the entire low pressure flash gas compression system may be regulated by any method known in the art. The regulation of the pressure in the surface pipeline is only disclosed as an example and is not intended to limit the invention. Other methods, such as using remotely operated subsea valves to control flow pressures, can also be used in various embodiments of the invention. Moreover, as previously mentioned, the operating pressures of the separators may be varied as long as the vapor pressure of the processed liquid hydrocarbons at the hydrocarbon outlet pipeline is at or near atmospheric pressure.

Those skilled in the art will appreciate that other embodiments of the invention can be devised which do not depart from the spirit of the invention as disclosed herein. Accordingly, the scope of the invention should be limited only by the attached claims.

What is claimed is:

1. A system for subsea flash gas compression, comprising:
   a first separator adapted to remove high pressure flash gas from a hydrocarbon product;
   a second separator adapted to remove low pressure flash gas from the hydrocarbon product after removal of the high pressure flash gas therefrom; and
   an ejector coupled at a high pressure input thereof to a high pressure flash gas output of the first separator, the ejector coupled at a low pressure input thereof to a low pressure flash gas output of the second separator, an output of the ejector coupled to an outlet pipeline extending from proximate the sea bottom to the sea surface.

2. The system of claim 1, further comprising:
   a valve at the sea surface operatively coupled to the outlet pipeline, the valve adapted to control a flow rate of gas from the outlet pipeline so that a selected pressure is maintained at the low pressure input to the ejector.

3. The system of claim 1, wherein a pressure at the low pressure input to the ejector is selected so that the hydrocarbon product comprises a vapor pressure at most equal to 14.7 psia after removal of the high pressure and low pressure flash gas therefrom.

4. The system of claim 1, wherein the second separator comprises an operating pressure of at most 14.7 psia.

5. The system of claim 1, wherein the first separator comprises an operating pressure of at least 500 psi.

6. The system of claim 1, further comprising:
   a control valve proximate the output of the ejector and adapted to adjust a flow pressure in the outlet pipeline.

7. The system of claim 6, wherein a geometric parameter of the ejector is selected so that operating pressures of the first and second separators will automatically adjust to equilibrium values after activation of the control valve.

8. The system of claim 7, wherein the geometric parameter comprises at least one of a cross-sectional area of an ejector nozzle, a cross-sectional area of an ejector diffuser, a cross-sectional area of the high pressure ejector input, a cross-sectional area of an ejector diffuser, and a cross-sectional area of the low pressure ejector input.

9. The system of claim 1, further comprising:
   a pump operatively coupled at its input to a liquid product output of the second separator, the pump operatively coupled at its output to a subsea liquid storage tank.

10. A method of separating flash gas from a hydrocarbon product, the method comprising:
    separating high pressure flash gas from the hydrocarbon product in a first separator, a flash gas output of the first separator coupled to a high pressure input of an ejector;
    separating low pressure flash gas from the hydrocarbon product after removal of the high pressure flash gas therefrom in a second separator, a flash gas output of the second separator coupled to a low pressure input of the ejector; and
    conducting an output of the ejector from proximate the second separator on the sea bottom to the sea surface.

11. The method of claim 10, further comprising:
    operating the second separator at a pressure of at most 14.7 psia, thereby producing a processed hydrocarbon product comprising a vapor pressure of at most 14.7 psia.

12. The method of claim 10, further comprising:
    transporting liquid hydrocarbon output of the second separator to a subsea storage tank.

13. The method of claim 10, further comprising:
    operating a valve at the sea surface to control a flow rate of gas from the ejector output so that a selected pressure is maintained at the low pressure input to the ejector.

14. The method of claim 10, further comprising:
    operating a control valve adapted to adjust a flow pressure of the ejector output.

15. The method of claim 14, further comprising:
    adjusting at least one of a cross-sectional area of an ejector nozzle, a cross-sectional area of an ejector diffuser, a cross-sectional area of the high pressure ejector input, and a cross-sectional area of the low pressure ejector input so that operating pressures of the first and second separators will automatically adjust to equilibrium values after operation of the control valve.

* * * * *